(12) United States Patent
Nix et al.

(10) Patent No.: US 12,238,819 B2
(45) Date of Patent: Feb. 25, 2025

(54) SYSTEM AND METHOD FOR WIRELESS ROAMING

(71) Applicant: Google LLC, Mountain View, CA (US)

(72) Inventors: Hayden Tadashi Nix, San Francisco, CA (US); Marc Naji Champagne Khouri, Jersey City, NJ (US); Naomi Jade McCracken, Milpitas, CA (US); Kevin Yukio Sakuma, Hemet, CA (US); Rebecca Silberstein, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 407 days.

(21) Appl. No.: 17/830,537

(22) Filed: Jun. 2, 2022

(65) Prior Publication Data

US 2023/0396978 A1 Dec. 7, 2023

(51) Int. Cl.
H04W 28/24 (2009.01)
H04W 8/02 (2009.01)

(52) U.S. Cl.
CPC ............. *H04W 8/02* (2013.01); *H04W 28/24* (2013.01)

(58) Field of Classification Search
CPC ................................ H04W 8/02; H04W 28/24
See application file for complete search history.

(56) References Cited

U.S. PATENT DOCUMENTS

| | | | |
|---|---|---|---|
| 2012/0196644 A1* | 8/2012 | Scherzer | H04W 72/02 455/524 |
| 2018/0324668 A1* | 11/2018 | Taskin | H04W 36/385 |
| 2021/0204175 A1* | 7/2021 | Rangaraju | H04W 12/037 |

FOREIGN PATENT DOCUMENTS

EP 3841787 A1 6/2021

OTHER PUBLICATIONS

Bansbach, Eike-Manuel, et al., "Deep Reinforcement Learning for Wireless Resource Allocation Using Buffer State Information", arXiv:2108.12198v1 [cs.NI] Aug. 27, 2021, Communications Engineering Lab, Karlsruhe Institute of Technology (KIT), 76187 Karlsruhe, Germany, 6 pages.

Chase, Jonathan David, "Investigating Applications of Optimization Techniques in Mobile Cloud Computing", School of Computer Science and Engineering, A thesis submitted to the Nanyang Technological University, 2017, pp. 1-200.

Li, Yue, "Edge computing-based access network selection for heterogeneous wireless networks", HAL open science, Networking and Internet Architecture [cs.NI]. Université de Rennes, 2017. English. NNT : 2017REN1S042, 143 pgs.

(Continued)

*Primary Examiner* — Michael T Vu
(74) *Attorney, Agent, or Firm* — Botos Churchill IP Law LLP

(57) ABSTRACT

The technology makes wireless roaming decisions for a computing device. The device is configured to determine whether to consider roaming and to generate a roam reason. The device determines a quality score for at least one access point within a wireless communication range of the device based at least in part on the roam reason. A target access point with a highest quality score is selected. The device may then determine to roam to the target access point, if the target access point is not the current access point to which the device is connected.

21 Claims, 9 Drawing Sheets

(56) References Cited

OTHER PUBLICATIONS

International Search Report and Written Opinion for corresponding International Application No. PCT/US2023/023519 dated Sep. 22, 2023 (16 pages).
"WiFi network selection based on RSSI velocity ED—Darl Kuhn", ip.com, ip.com Inc., West Henrietta, NY, US, Jan. 4, 2019, 6 pages, XP013181561, ISSN: 1533-0001.

* cited by examiner

EWMA Signal Strength/Velocity Score Table 300

| | > 9 dBm/s Rapid Increase | 9 to 6 dBm/s Increase | 6 to 3 dBm/s Gradual Increase | 3 to -3 dBm/s Stable | -3 to -6 dBm/s Gradual Decrease | -6 to -9 dBm/s Decrease | < -9 dBm/s Rapid Decrease |
|---|---|---|---|---|---|---|---|
| >= -50 dBm Very Strong | 90 | 95 | 100 | 100 | 90 | 80 | 70 |
| -60 to -51 dBm Strong | 80 | 85 | 95 | 90 | 75 | 65 | 50 |
| -70 to -61 dBm Adequate | 40 | 55 | 60 | 55 | 45 | 30 | 15 |
| -80 to -71 dBm Weak | 25 | 35 | 30 | 20 | 15 | 10 | 0 |
| < -80 dBm Very Weak | 15 | 10 | 0 | 0 | 0 | 0 | 0 |

FIG. 3

EWMA SNR Score Table 400

| > 40 dBm Solid | 25 - 40 dBm Stable | 15 - 25 dBm Hindered | 10 - 15 dBm Interfered | < 10 dBm Interrupted |
|---|---|---|---|---|
| 100 | 85 | 50 | 20 | 0 |

FIG. 4

Frequency Band Bonus/Penalty Table 500

| 6GHz | 5GHz | 2.4GHz |
|---|---|---|
| 5 | 0 | -10 |

FIG. 5

Score Adjustment Table 600

| | | | Score Adjustment |
|---|---|---|---|
| Historical Data | Internet Reachability | For BSSs that show historical internet reachability | +10 |
| | Disconnect Reason Codes | For BSSs with historical FailedToConnect reason codes | -5 |
| | Connection Duration | For BSSs with historical connection duration < 1 min | -15 |
| | | For BSSs with historical connection duration < 5 mins | -5 |
| | | For BSSs with historical connection duration > 60 mins | +10 |
| BTM Indication | | For BSSs suggested by current AP | +15 |
| RoamReason Types | InternetUnreachable | For current BSS, roaming is critical. Additional for candidate BSS scores that show historical internet reachability | -50 +10 |
| | GatewayUnreachable | For current BSS, roaming is critical. | -50 |
| | FailedToAquireAddress | For current BSS, roaming is critical. | -50 |
| | BTMDisconnectImminent | For current BSS, roaming is critical. Additional for BTM suggested BSSs | -50 +25 |
| | InsufficientSignal | For current BSS, roaming is important | -15 |
| | DegradingSignal | No adjustment, roaming is worth considering. | 0 |
| | SuboptimalSignal | For current BSS, risk-averse roaming. Implementation | +15 |

FIG. 6

SYSTEM AND METHOD FOR WIRELESS ROAMING

CROSS-REFERENCE TO RELATED APPLICATIONS

This application is related to co-pending application Ser. No. 17/830,559, filed Jun. 2, 2022 and entitled Predictive Data Rates for Wireless Roaming and Selection, the entire disclosure of which is incorporated herein by reference.

BACKGROUND

Wireless roaming can occur when a device configured for wireless communication transitions from one access point to another access point, for example to seek better performance. Wireless roaming is common in home, public, and enterprise networks, where multiple access points offering connectivity for network services are used to increase the coverage area of the network. Failing to make suitable roaming decisions can cause the wireless device to unnecessarily transition between access points, or select a suboptimal access point that may not be able to support the services utilized by the device. This can degrade performance of the wireless device, for instance through loss of data packets or failure to buffer streaming content.

Many existing roaming approaches are static, measurement-only approaches, which make roaming decisions by comparing specific physical attributes of the connection options. The physical attributes usually include signal strength, signal-to-noise ratio (SNR), wireless channel, frequency band, or some combination of all of them. Often, the decision to roam is made simply by deciding whether the signal strength (or other attribute) of a candidate connection at a given point in time is higher than the existing connection by some threshold.

BRIEF SUMMARY

Aspects of the disclosure provide a technical solution to the technical problems involved in wireless roaming. The approaches disclosed herein enable wireless computing devices (sometimes referred to herein as "stations") to make informed roaming decisions based on possible disadvantages (sometimes referred to as the "risk" of roaming), what it would take in terms of resources to effect roaming (sometimes referred to as the "cost" of roaming), and possible benefits of roaming (sometimes referred to herein as a roaming "reward"). This technical solution can help maximize the likelihood of a reliable, performant wireless experience. In this manner, the systems and methods described herein can avoid dropped data packets, maintain adequate buffering for streaming apps, and avoid latency and other issues that can adversely affect operation of a user's wireless device.

According to one aspect, a method is provided for determining roaming. The method comprises: determining, by one or more processors of a computing device, whether to consider roaming when the computing device is wirelessly connected to a current access point, the computing device being within a wireless coverage range of a plurality of access points, the plurality of access points including the current access point and at least one candidate access point different from the current access point; generating, by the one or more processors, a roam reason after the one or more processors determine to consider roaming; determining, by the one or more processors, a quality score for at least one of the plurality of the access points based at least in part on the roam reason; selecting, by the one or more processors after the determining, a target access point with a highest quality score from the plurality of the access points; and determining, by the one or more processors, to roam from the current access point to the target access point when the target access point is not the current access point.

In one example, the method further comprises roaming, by a transceiver of the computing device, from the current access point to the target access point when the target access point is not the current access point. The quality score for each corresponding access point may indicate a physical layer connection quality for the corresponding access point.

In one scenario, determining the quality score may include: calculating the quality score for each of the plurality of the access points; and adjusting the quality score for at least one of the plurality of the access points based at least in part on the roam reason. Calculating the quality score may be based on at least one physical attribute of a corresponding one of the plurality of access points. The at least one physical attribute may include one or more of signal strength, signal strength velocity, signal-to-noise ratio, or a frequency band. Adjusting the quality score for at least one of the plurality of the access points may be based at least in part on one or more of: historical performance of a corresponding one of the plurality of access points based on one or more prior connections within a selected timeframe; a roam suggestion or disconnect indication provided by the current access point; or power consumption for changing the network or subnet.

In one scenario, determining whether to consider roaming may include evaluating one or more of: connection quality of the current access point reported by a network protocol stack or a network policy module of the computing device; a system requirement of the computing device; an application currently running on the computing device; a current operating environment of the computing device; or the quality score of the current access point.

In one example, the method further comprises recording, monitoring and updating data associated with each access point for approximating connection quality of the access point. The data associated with each access point may relate to one or more of: Open Systems Interconnect (OSI) layer 1, OSI layer 2, OSI layer 3, or a wireless local area network (WLAN) management module. The data related to the OSI layer 1 may include one or more of: exponentially weighted moving average signal strength, signal strength velocity, exponentially weighted moving average signal-to-noise ratio, channel or channel bandwidth. The data related to the OSI layer 2 may include one or more of: exponentially weighted moving average physical layer rate, radio resource management report, or a transition management indication. The data related to the OSI layer 3 may include one or more of: current Internet reachability, historical Internet reachability, or gateway reachability. The data related to the WLAN management module may include historical data indicating one or more of: time-to-connect, connection duration, disconnect reason, disconnect signal strength, or average transmit physical layer rate.

In one scenario, the roam reason may include one or more of: a) Internet unreachable; b) no route to a gateway; c) failure to receive an address; d) failure to meet a rate requirement; e) imminent disconnection; f) connection signal strength below a threshold; g) signal insufficiency; or h) suboptimal connection not satisfying one or more criteria.

According to another aspect, a system is provided. The system comprises a transceiver configured to establish a wireless connection with a first access point of a plurality of access points, the transceiver being within a wireless coverage range of each of the plurality of access points; and one or more processors operatively coupled to the transceiver. The one or more processors may be configured to: determine whether to consider roaming; generate a roam reason after determining to consider roaming; determine a quality score for at least one of the plurality of the access points based at least in part on the roam reason; select, after the determination, a target access point with a highest quality score from the plurality of the access points; and determine to roam from the first access point to the target access point when the target access point is not the first access point.

In one example, the one or more processors may be further configured to instruct the transceiver to roam from the first access point to the target access point when the target access point is not the first access point.

The one or more processors may be configured to determine the quality score by: calculation of the quality score for each of the plurality of the access points; and adjustment of the quality score for at least one of the plurality of the access points based at least in part on the roam reason. The one or more processors may be configured to calculate the quality score for each of the plurality of the access points based on at least one physical attribute of its corresponding access point. The at least one physical attribute may include one or more of signal strength, signal strength velocity, signal-to-noise ratio, or a frequency band. The one or more processors may be configured to adjust the quality score for at least one of the plurality of the access points based at least in part on one or more of the following: historical performance of a corresponding one of the plurality of access points based on one or more prior connections within a selected timeframe; a roam suggestion or disconnect indication provided by the first access point; or power consumption for changing the network or subnet.

The one or more processors may be configured to determine whether to consider roaming by evaluating one or more of: connection quality of the first access point reported by a network protocol stack or a network policy module of the system; a system requirement of the system; an application currently running on the system; a current operating environment of the system; or the quality score of the first access point.

A further aspect provides a non-transitory computer-readable medium comprising computer-readable instructions. The instructions, when executed by a processor, cause the processor to: determine whether to consider roaming when a computing device is wirelessly connected to a current access point, the computing device being within a wireless coverage range of a plurality of access points, the plurality of access points including the current access point and at least one candidate access point different from the current access point; generate a roam reason after the processor determines to consider roaming; determine a quality score for at least one of the plurality of the access points based at least in part on the roam reason; select a target access point with a highest quality score from the plurality of the access points; and determine to roam from the current access point to the target access point when the target access point is not the current access point.

BRIEF DESCRIPTION OF THE DRAWINGS

FIG. 3 illustrates a signal strength/velocity score table in accordance with aspects of the disclosure.

FIG. 4 illustrates a signal to noise ratio score table in accordance with aspects of the disclosure.

FIG. 5 illustrates a frequency band bonus/penalty table in accordance with aspects of the disclosure.

FIG. 6 illustrates a score adjustment table for selection in accordance with aspects of the disclosure.

DETAILED DESCRIPTION

Figure 1:
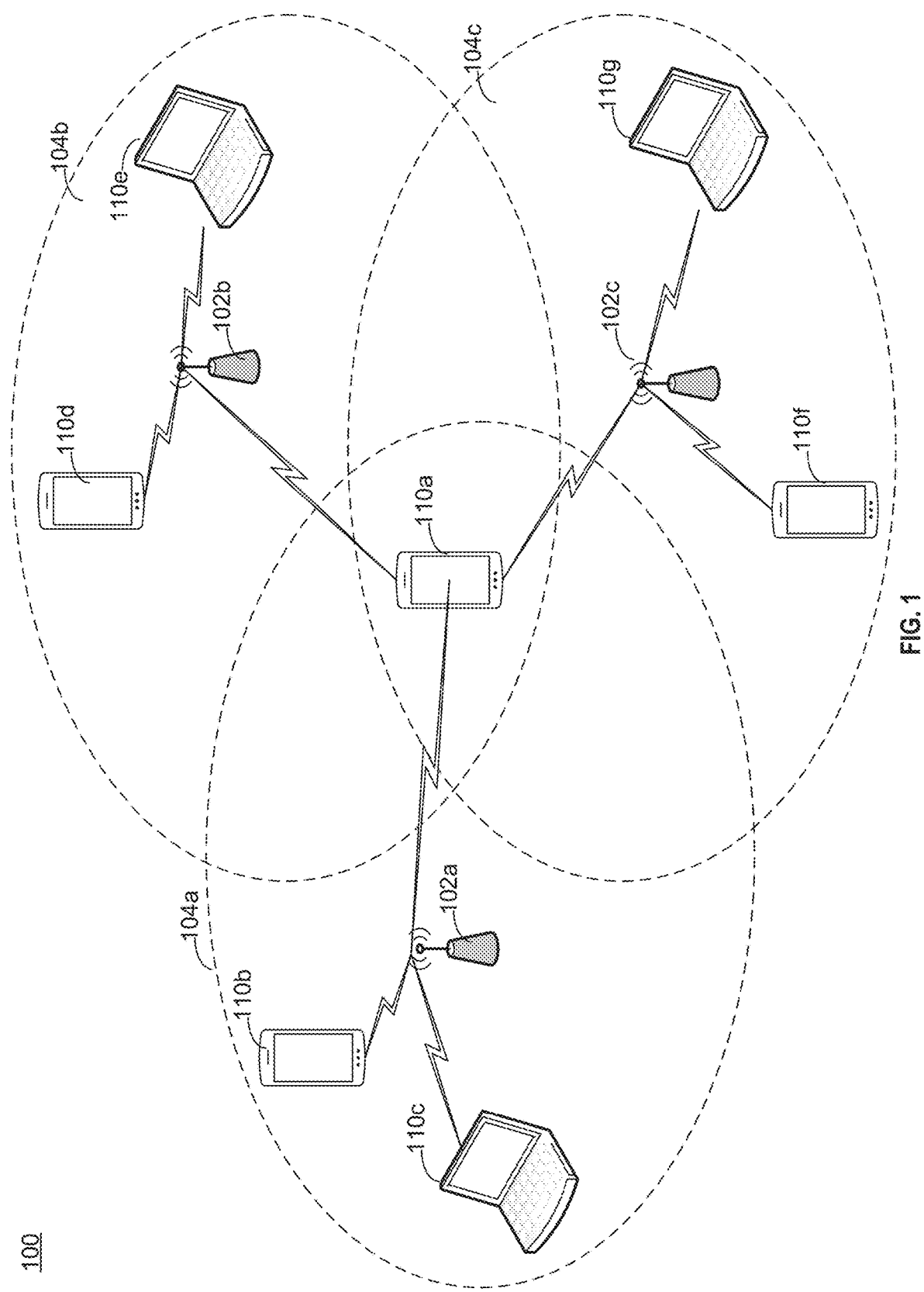
FIG. 1 illustrates an example access point environment that supports wireless roaming in accordance with various aspects of the present disclosure.

Existing approaches may have technical problems that result in poor roaming decisions. For example, some wireless devices may greedily seek better performance and roam too aggressively, which can cause frequent interruptions to connectivity. In another example, some wireless devices may default to delaying roaming decisions, causing them to maintain inadequate connections for longer when there are better alternatives available. Certain approaches to decision-making have the following technical problems. For example, they may not consider issues associated with roaming, such as a potential disruption of the user's pending task, as a result of roaming. Further, they may not consider nor anticipated benefits of roaming, such as a potential improved overall user experience as a result of roaming. In addition, they may not adapt the decision logic based on previous experience, resulting in repeated poor decisions. All of this can adversely affect the performance of the wireless device. For instance, in a client computing device streaming apps, games, movies or other content, connectivity disruptions may cause issues with data buffering or interruption of real-time interaction such as during a video conference.

The technical solution involves enabling informed roaming decisions for wireless devices based on issues such as potential interruptions to a user's experience of using network connection, and advantages such as potential improvements to the user's experience and enhanced device functionality. The technical solution may include both selection of an initial access point (e.g., when the wireless device boots up) and deciding whether to transition (roam) to a different access point after the initial access point is selected. One embodiment involves making an automatic roaming decision by the computing device, which includes evaluating a current connection (if any), evaluating candidate connections, and then making an assessment based on certain criteria. The system may determine a quality score for each connection, and automatically decide to roam to the connection with the highest quality score.

When evaluating the current connection, the system may consider various aspects such as signal strength, system requirements, user needs, and historical connection performance. User needs may be determined based on the application(s) currently running on the computing device. For instance, the computing device may have one or more of the following in progress: podcast download or media streaming in progress, large file transfer in progress, or cloud gaming in progress. The user needs may affect the quality score of the connection. For instance, podcast download, media streaming and large file transfer may place importance on stability of the connection, causing the quality score to be heavily influenced by connection stability. On the other hand, cloud gaming may place importance on latency of the connection, causing the quality score to be heavily influenced by connection latency.

When evaluating candidate connections, similar information may be considered to the extent that it is available for the different connections. Here, there may be little to no historical connection performance information available for certain candidates, because those candidates may not have been used by the wireless device within a certain timeframe (e.g., within the last 12 hours, last 7 days, or other historical timeframe), which in turn may cause a reduction on their quality scores. Based on these evaluations, the system assesses the advantages and disadvantages of changing from a current connection to a different connection. For instance, roaming to a connection that has performed well in the past can carry less downside or be less likely to cause an interruption to the user, whereas roaming when an app involves a latency dependent task (e.g., streaming a movie or other content), is more likely to cause a disruption (and hence have higher "risk").

The technical solution disclosed herein may benefit any project, station or device that implements Wi-Fi roaming. For stationary stations, the technical solution disclosed herein may lead to a decrease in disconnections caused by an access point forcing a disassociation. By considering Internet reachability in roaming decisions, the stationary station may spend less time in an unreachable state. Further, the technical solution may lead to a decrease in roam scans, as the selected access points better meet system needs. Further, the technical solution may result in an improvement in non-signal strength measurements (e.g., Internet reachability, peak PHY rate) and fewer occurrences of unmet system requirements. Additionally, the technical solution may result in an average signal strength decrease, because roaming may result in selecting access points with good overall performance over access points with strong signals. For mobile stations, as with stationary stations, the technical solution may lead to a decrease in the number of disconnects forced by an access point, a decrease in time spent in an unreachable state, a decrease in roam scans, and an improvement in non-signal strength related metrics. For mobile stations, the technical solution may result in an increase in average signal strength, as the technical solution selects better access points and leaves poor access points more quickly. The technology will now be described with respect to the following exemplary systems and methods.

Note that in the following discussion, the term "station" or "STA" is used to denote a computing device that can connect to a wireless network (also known as a "wireless device"). The device may be mobile or stationary. The term "station" or "STA" corresponds to a client device, such as a user's mobile phone, their tablet, netbook or other laptop PC, a wearable device (e.g., a smartwatch or head-mounted display), etc. The term "access point" or "AP" is used to denote a device through which stations can connect to a basic service set ("BSS") within a wireless network. The term "current access point" is used to denote the access point that a station is currently connected to. The term "candidate access point" is used to denote an available access point that a station is capable of joining. The candidate access point may include the current access point. The term "basic service set" or "BSS" is used to denote a subset of a network including one access point and its associated stations. The term "extended service set" or "ESS" is used to denote one or more BSSs forming a larger, single network. The term "local roaming" describes when a station moves from one BSS to another within an ESS. In the following discussion, roaming refers to local roaming unless otherwise specified. The term "current BSS" is used to denote the BSS that a station is currently part of. The term "candidate BSS" is used to denote an available BSS that a station is capable of joining. The candidate BSS may include the current BSS. The term "non-candidate BSS" is used to denote a BSS that is not current or candidate. The term "exponentially weighted moving average" or "EWMA" is used to denote a technique used to average time series data where older data are given exponentially lower weights. This technique can be used to smooth volatility in time series data, especially when the measurement itself has uncertainty.

1. Overview

FIG. 1 illustrates an example access point environment 100 that supports roaming in accordance with aspects of the present disclosure. The access point environment 100 may include a plurality of access points 102a, 102b, and 102c, each having its own corresponding BSS 104a, 104b or 104c. Each BSS may provide network coverage, such as Internet coverage, to one or more stations positioned within the corresponding geographic coverage area. For instance, a first access point 102a or a first BSS 104a may provide network coverage to stations 110a, 110b, and 110c. A second access point 102b or a second BSS 104b may provide network coverage to stations 110a, 110d and 110e. A third access point 102c or a third BSS 104c may provide network coverage to stations 110a, 110f and 110g. A station can be covered by more than one access point or BSS. As illustrated in FIG. 1, the station 110a may communicate with any one of the first BSS 104a, the second BSS 104b and the third BSS 104c. In one example, the station 110a may be currently connected to the access point 102a or the BSS 104a, while residing at a position reachable by other access points 102b and 102c or other BSSs 104b and 104c. These other access points 102b and 102c may be regarded as candidate access points. These other BSSs 104b and 104c may be regarded as candidate BSSs. Different arrangements in other examples are possible.

Figure 2A:
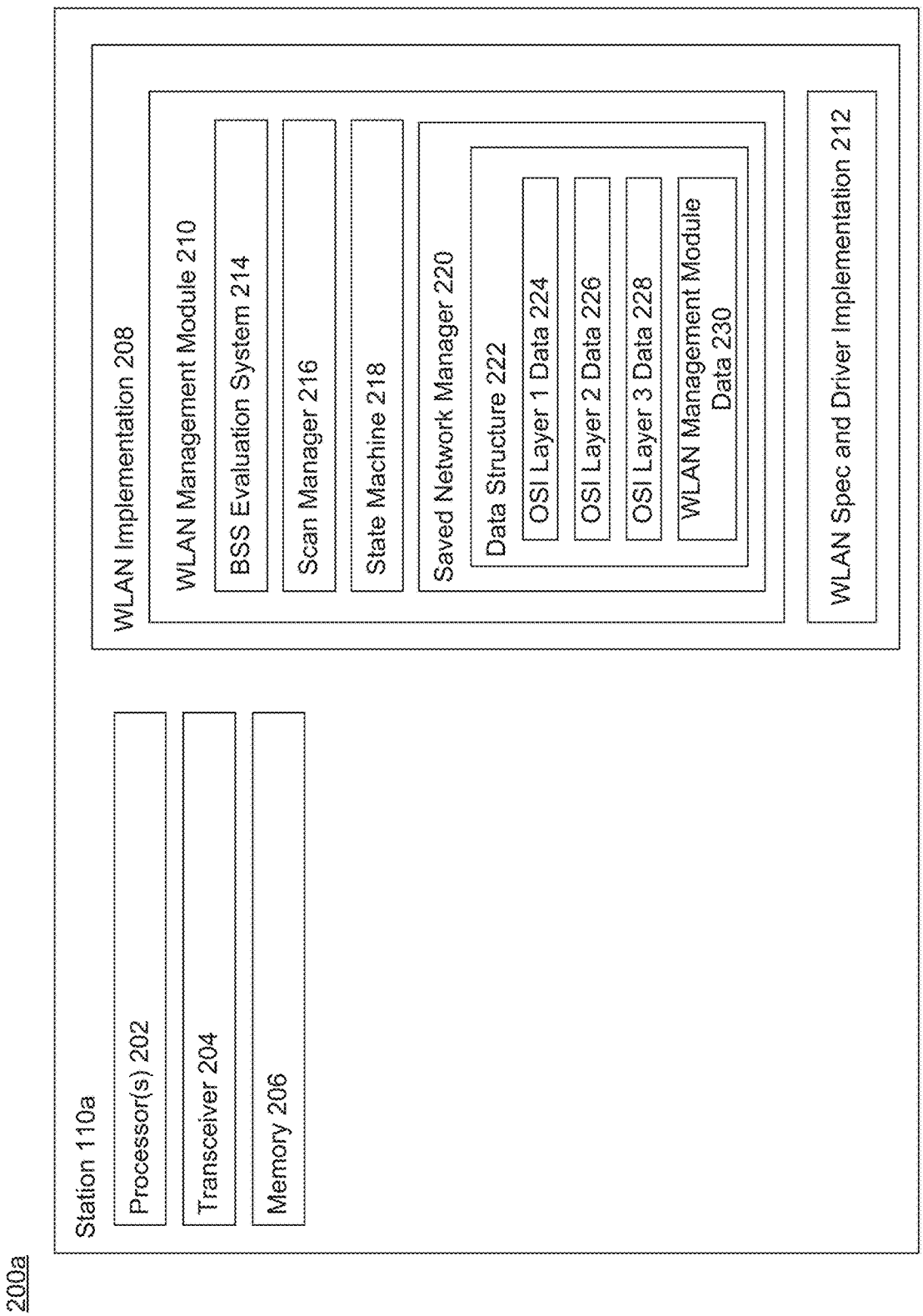
FIG. 2A illustrates a functional diagram of an example station including a system for determining roaming in accordance with aspects of the disclosure.
Figure 2B:
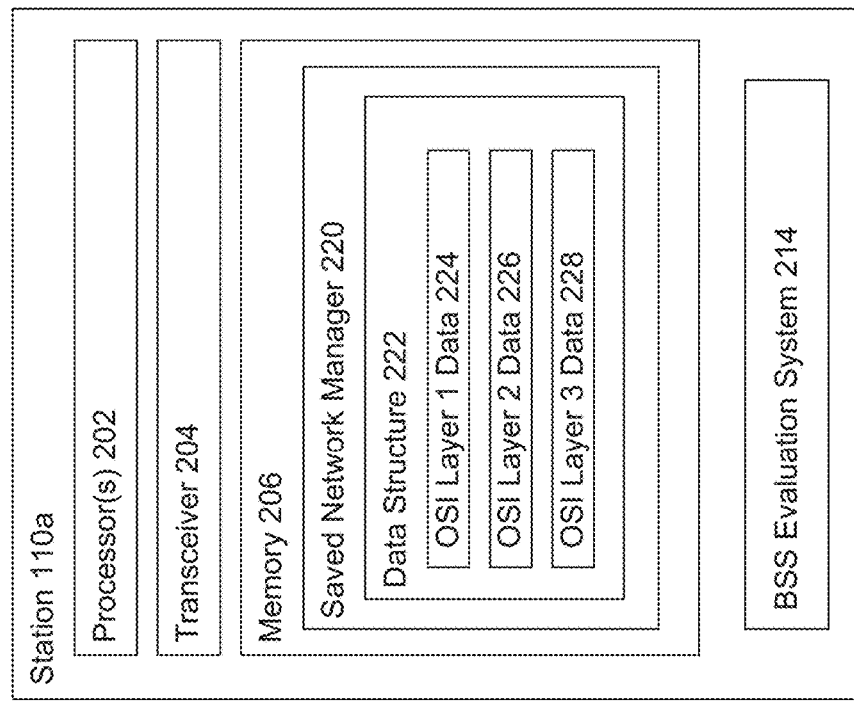
FIG. 2B illustrates another functional diagram of an example station including a system for determining roaming in accordance with aspects of the disclosure.

Referring to examples 200a and 200b illustrated in FIGS. 2A and 2B, the station 110a may include one or more processors 202, a transceiver 204 and memory 206. The station 110a may include a BSS evaluation system 214. The system 214 may be implemented or controlled by the one or more processors 202. The system 214 may evaluate the station's connection to any BSS and make informed roaming decisions. Modules and instructions within the system 214 may be executable by the one or more processors 202.

In the example 200a as shown in FIG. 2A, the system 214 may be part of wireless local-area network (WLAN) implementation 208. The WLAN implementation 208 may include a WLAN management module 210 and WLAN spec and driver implementation 212. The WLAN management module 210 may handle the logic and decision making related to WLAN functionality. The WLAN management module 210 may maintain a system-level application programming interface (API) for WLAN connectivity, ensuring secure, contention-free actions like connection selection, scanning, and data persistence, among others. In one configuration, the system 214 may be implemented as part of the WLAN management module 210. In the example 200b as illustrated in FIG. 2B, the system 214 may be implemented without the WLAN management module 210.

The system 214 may gather and record data about the current access point 102a or current BSS 104a, and candidate access points 102b and 102c or candidate BSSs 104b and 104c, and use these data to approximate connection quality of each access point or each BSS. The system 214 may continuously monitor and update this data. The system 214 may determine current access point or current BSS adequacy by evaluating how well the current connection is meeting system needs, compare the current access point to candidate access points or compare the current BSS to candidate BSSs 104b and 104c, select a target BSS for roaming based on the comparison, and ultimately make the decision to roam if the reward and necessity of roaming outweigh the risks.

The transceiver 204 may be configured to establish a connection with any selected access point or any selected BSS. Initially, the transceiver 204 may establish a connection with a first access point to join a first BSS, such as BSS 104a. Once the system 214 makes any roaming decision, it may instruct a transceiver 204 to perform roaming. When the system 214 determines to roam to a second access point 102b or second BSS, such as BSS 104b, the transceiver 204 may roam from the first access point to the second access point to join the second BSS. These operations may be done according to a state-based roaming approach, as discussed further below.

2. Record Connection Quality Data

The system 214 may include a saved network manager 220 to store data related to each network saved on the station 110a. As illustrated in the figures, the saved network manager 220 may reside in the memory 206. The network data stored in the saved networks manager 220 may contain data about the candidate access points or candidate BSSs as well as the current access point or current BSS within that network. The system 214 may rely on the data to evaluate how well or poorly the current access point or current BSS 104a is meeting system needs, and how well or poorly each candidate access point or candidate BSS may meet the system needs.

Data for each access point or BSS may be recorded in a data structure 222, such as a connection quality data structure. Values stored in the data structure 222 may change when gaining access to new information, for instance signal strength or other information obtained by the transceiver 204. The data structure may be flexible. The data structure may be read and modified often. The data structure 222 for each access point or BSS may include one or more of the following: data 224 related to layer 1 of open systems interconnection (OSI), data 226 related to OSI layer 2, data 228 related to OSI layer 3, and data 230 related to a WLAN management module. In the example 200a illustrated in FIG. 2A, the data structure 222 may include one or more of OSI layer 1 data 224, OSI layer 2 data 226, OSI layer 3 data 228, and WLAN management module data 230. In the example 206b illustrated in FIG. 2B, the data structure 222 may include one or more of OSI layer 1 data 224, OSI layer 2 data 226, and OSI layer 3 data 228. The list below describes example data that may be included in the data structure 222 of each access point or BSS. This list may not be exhaustive. Not everything on the list may necessarily need to be stored for each access point or BSS or at all. Some of the data may be only useful for a short time after they are taken, such as Internet reachability, which may be useful for some maximum period of time such as 1-120 seconds, or more or less. In one example, some ephemeral data that is useful for a very short time (e.g., less than 2-5 seconds), such as signal strength, may not need to be stored at all.

2.1 Layer 1 Data

OSI layer 1 data 224 may include physical layer data, such as radio frequency (RF) data, including, but not limited to, EWMA signal strength, signal strength velocity, EWMA SNR, channel and channel bandwidth. In particular, the EWMA signal strength may refer to exponentially weighted moving average or smoothed signal strength value, measured in decibel-milliwatts (dBm), from received signal strength indicator (RSSI) or received channel power indicator (RCPI). The signal strength velocity may refer to a rate of change of the EWMA signal strength over time, measured in dBm/s. The EWMA SNR may refer to exponentially weighted moving average or smoothed signal-to-noise ratio, measured in dBm. The channel may refer to the channel that the access point or BSS is operating on, which may also be used to determine the frequency band. The channel bandwidth may refer to the width of the channel being used, measured in megahertz (MHz). dBm is a logarithmic unit, which is considered when calculating the moving average between multiple measurements. In order to calculate the arithmetic average of dBm, dBm may be converted to mW to compute the linear average, which is then converted back to dBm. The logarithmic scale may be considered when selecting values like ranges, variance, and thresholds for signal strength, SNR, and velocity.

2.2 Layer 2 Data

OSI layer 2 data 226 may include link-layer data, including, but not limited to, EWMA physical layer (PHY) rates, radio resource management (RRM) reports, and BSS transition management (BTM) indications. The EWMA PHY rates may refer to exponentially weighted moving average or smoothed transmit physical layer (TX PHY) rates determined by firmware, and received physical layer (RX PHY) rates from the access point, measured in megabits per second (Mbps). The RRM reports may refer to reports providing information about RF environment, including radio measurement reports, link measurement reports, and neighbor reports. The BTM indications may include roam suggestions or disconnect indications from the access point. In one example, the BTM indication may indicate which BSSs have been suggested by an access point.

PHY rates may vary significantly. Rates may drop very low when the station is idle with no data to send. In one example, to get an accurate picture of what rate is capable, idle rates may be filtered out, such that rates may be only considered when data is actually flowing. The remaining values may then be smoothed using EWMA. The EWMA values may be used to calculate connection averages.

In some scenarios, measurements may not be obtained at perfect intervals. For example, with PHY rates, some of the periodic measurements may be dropped because the station is idle. As a result, the system 214 may weigh older data, even if it is the most recent usable data. The system 214 may use time in the EWMA weight, rather than number of measurements. The amount of weight the new measurement has in the average may be proportional to the time since the measurement was last adjusted.

2.3 Layer 3 Data

OSI layer 3 data 228 may include network layer data from a network protocol stack (a "netstack") or a network policy module. The network layer data may include, but not limited to, current Internet reachability, historical Internet reachability and gateway reachability. The current and/or historical Internet reachability may indicate wider area network connectivity. The gateway reachability may indicate connectivity to the rest of the local area network.

2.4 WLAN Policy Module Data

WLAN management module data 230 may include historical data for each connection. The historical data may be up to a historical time threshold. The historical data may include, but not limited to, time-to-connect, connection duration, disconnect reason, disconnect signal strength, and average TX PHY rate. The time-to-connect data may refer to the time taken to connect to the access point or BSS. The connection duration may refer to how long the connection is up. The disconnect reason may include the cause of disconnect. The disconnect signal strength may refer to the signal strength value at disconnect. The average TX PHY rate may refer to the average non-idle TX PHY rate over the connection duration. The historical data for each connection may be saved for some period of time (e.g., a day, a week, a month, or more or less), and may be overwritten with newer data or deleted once that amount of time has passed.

2.5 Other Data

Aside from examples provided above, the data structure 222 for each access point or BSS may also include other data, such as dynamic host configuration protocol (DHCP) stats, packet loss, and more specific reachability targets, among other possibilities. The specific reachability targets may take into account certain nuances. In one example, a BSS may show reachability to the Internet most of the time, but frequently lose that connection briefly (e.g., for a few seconds or so). In another example, a BSS may be able to reach some parts of the Internet, but perhaps not a specific hosting server required for some device functionality (e.g., a package server, an update server, a cache server that saves web pages or other content, etc.). And in a third example, a specific reachability target may depend on a reachability API from the network policy module.

3. Monitor and Update Connection Quality Data

The system 214 may regularly monitor the recorded data for each access point or BSS, system requirements of the station 110a, and feedback from other system components. The system 214 may update the data for each access point or BSS whenever new data becomes available. In one example, the system 214 may update one or more data for the current access point 102a or BSS 104a periodically, such as every second or every minute (or more or less frequently). For instance, signal strength and the signal to noise ratio for the current access point 102a or BSS 104a may be updated every second.

The system 214 may perform a passive scan or a burst of several active scans to discover any candidate access point or BSS within a communication range of the station 110a. A passive roam scan may observe all available access points or BSSs in the environment that are detectable by the wireless device/station. Active scans may run more quickly on specific channels, which are targeted at one or more specific known access points or BSSs. Executing a burst of active scans, or several in fast succession (e.g., within a few milliseconds or a few seconds), the RSSI velocity may be determined and stored as part of the access point or BSS data. The system 214 may compile a list of candidate access points or candidate BSSs, and update the list and data of each candidate access point or candidate BSS after each roam scan.

In one example, a scan manager 216 implemented or controlled by the one or more processors may manage the frequency of roam scans. A timer may be used after each roam attempt to prevent roam scans from occurring too frequently. The scan manager 216 may support bursts of active scans. The scan manager 216 may help with improving scan efficiency such as batching, and manage different scan types. In one example, by batching passive scans for roaming with those done for other reasons, data for candidate access points or candidate BSSs may be updated more often, without adding additional compute or other resource cost.

In another example, instead of initiating a roam scan, the system 214 may discover any candidate access point or candidate BSS and update its data based on RRM report, BTM indications, and any previous scans to understand the candidate access point or candidate BSS. The RRM reports and/or BTM indications may be relied on to help eliminate the need to perform a roam scan. The RRM reports and/or BTM indications may indicate the RF environment, thus reducing the frequency with which a full passive scan needs to be performed.

Some data may be only valuable for a short period of time. For such data, the old value may be overwritten when a new value is obtained, to ensure that only recent data is considered in evaluations. The system 214 may choose to make use of a previous value when calculating the new one, such as the EWMA signal strength for the current access point 102a or BSS 104a. The latest signal strength measurement may be factored into the EWMA, at which point the old one is no longer needed. These old data values may be thrown out immediately after use.

Some data, like Internet connectivity or channels, may be relevant for a longer period of time. However, such data may eventually become stale. Here, the relevancy of the data may time out after a certain amount of time from when it was last observed in a scan result or RRM report. Some data may be unlikely to change or provide longer-term value, such as historical disconnects, and channel, among others. Such data may be purged once they exceed a certain age or if new information indicates a change. The system 214 may update the data for each access point or each BSS as follows.

3.1 Layer 1 Data

For the current access point 102a or current BSS 104a, OSI layer 1 data 224 measurements may be observed in the state machine 218 at the WLAN management module 210 at regular intervals, such as every second. The state machine 218 may maintain the state of the current connection (e.g., a connected state, a connecting state or a disconnected state) and assist in moving between different states. Based on measurements obtained in the state machine 218, the system 214 may update OSI layer 1 data 224, such as the EWMA signal strength, the SNR value, and/or the velocity. The OSI layer 1 data may be updated spontaneously by other methods.

For candidate access points 102b and 102c or candidate BSSs 104b and 104c, OSI layer 1 data 224 measurements may be gathered by the system 214 when a candidate access point or candidate BSS is observed in a roam scan. The system 214 may do a burst of several active scans targeting some of the candidate access points or candidate BSSs to gather time series data for EWMA and velocity calculations. When there is no roam scan, OSI layer 1 data 224 measurements may be obtained from RRM reports generated by other stations or the access point that the current BSS is connected with.

3.2 Layer 2 Data

The PHY rate for the current access point 102a or current BSS 104a may be observed by the state machine 218. When the WLAN management module 210 receives an RRM report from an access point, the system 214 may use the RRM report to update data for any access point or BSSs that are reported on, such as channel, frequency, among others. Additional metadata from the RRM report may be stored in separate RRM reports fields to be saved along with other data in the data structure 222 for the access point or BSS. The RRM reports fields may include, but not limited to, data from link measurement reports, observations of candidate access points or candidate BSSs in neighbor reports, among others.

When the WLAN management module 210 receives a BTM response, the system 214 may update the BTM indications of the suggested access point or BSS to indicate that the current access point suggests the station transition there.

3.3 Layer 3 Data

OSI layer 3 data 228 may primarily be gathered through feedback from other system components, including but not limited to netstack, and network policy, among other possibilities. Netstack or network policy may send status information to the WLAN management module about its view of connectivity state, including but not limited to Internet reachability, and DHCP stats, among others.

3.4 WLAN Policy Module Data

The WLAN management module data 230 may be gathered by the state machine 224. When a connection to an access point or BSS occurs, the time-to-connect may be recorded. When a disconnect occurs, such as an unexpected disconnect or failure to connect occurs, the reason for disconnection and connection duration may be recorded. The average non-idle TX PHY rate over the connection duration may be calculated and stored.

3.5 Other Data Gather/Update Methods

Any data within the data structure 222, such as OSI layer 1 data 224, OSI layer 2 data 226 and OSI layer 3 data 228 may be gathered and/or updated by other methods without relying on the WLAN management module 210 or any components thereof.

4. Consider Roaming

The system 214 may determine whether to consider roaming based on how adequate the current connection is and the risk of roaming. The better the current connection, the riskier leaving it is. Connection quality of an access point or BSS may be determined using physical attributes of the access point or BSS (such as signal strength), system requirements of the station 110a, user intentions, and historical performance of the access point or BSS (such as how reliable the connection has been in the past).

The risk of roaming may depend on the current access point or current BSS connection quality. For example, if the current connection is inadequate for some requirement, or if the current connection has a low quality, the risks of roaming may be low, and the likelihood of roaming is increased. If the current connection throughput is low, but adequate for all system requirements, the risks of roaming may be high, and the likelihood of roaming is decreased, since it would involve leaving a working connection. If that same connection has performed well historically, roaming may be even riskier and less likely. In one example, the system 214 may determine whether to consider roaming, based on one or more of the following: feedback about the current connection and system requirements, score of the current access point or BSS, and other factors. Further details regarding these processes are provided below.

4.1 Evaluate Feedback and System Requirements

The system 214 may determine whether to consider roaming based on feedback from other systems of the station (client device). The feedback may indicate that the current connection is inadequate and roaming should be considered. Components like network policy and netstack may send feedback about the current connection or system requirements from their perspectives to the system 214. Such feedback may relate to OSI layer 2 data 226 and OSI layer 3 data 228. The system 214 may use the status reports to determine if roaming should be considered.

In one example, netstack L3 status feedback may show that Internet is unreachable when using the current access point or BSS. Based on this feedback, the system 214 may determine that roaming should be considered. In another example, user intent from network policy may indicate that the current access point or BSS is a soft access point of an Internet of things (IoT) device, where the soft access point is used for device setup. Based on the user intent (e.g., device setup), the system 214 may determine that roaming should not occur. In a further example, BTM indications may provide feedback to the system 214 that the access point suggests roaming to a different access point or BSS and that a disconnect is imminent. Based on this feedback, the system 214 may determine that roaming should be considered. In yet another example, the system 214 may receive system requirements from the network policy about connection requirements of applications running on the system.

System requirements may include, but not limited to, Internet reachability, namely, if the system needs Internet connection, a specific network requirement, and different data rate requirements for certain applications. For example, if an application requires a certain rate, e.g., 50 Mbps, but the current access point or BSS is only capable of achieving 25 Mbps. Based on the system requirements, the system 214 may determine that roaming should be considered. In another example, if the application requires being on a specific access point or BSS to perform certain functions, such as a smart home device requiring to be on a certain Wi-Fi connection, then the system 214 may determine that roaming should not be considered when the current access point or BSS is the required access point or BSS.

4.2 Scoring BSS

The system 214 may periodically calculate a quality score for the current access point or BSS by using its data, for example, by particularly using OSI layer 1 data 224. The quality score may serve as a measure of physical layer connection quality. If the quality score indicates that the current connection is poor based on comparison to some tunable threshold, or that the current connection could become poor in the near future, the system 214 may determine that roaming should be considered, even if feedback from other components has been acceptable. For example, on a scale of 1 to 100, a poor connection quality may be a score below 30, where 30 may represent a threshold for reasonable performance. The threshold value, such as 30, may change based on implementation details, testing, tuning, and device type. An example of a degrading connection may be one where the score is decreasing over time, approaching some threshold for reasonable performance.

The quality score may take into account OSI layer 1 data 224 in aggregation. Each OSI layer 1 data point, when considered alone may not indicate much about quality. However, when considered in aggregation, such OSI layer 1 data 224 may indicate physical layer connection quality. In one example, the quality score may be calculated based on the following data: EWMA signal strength, signal strength velocity, and EWMA SNR. A bonus or penalty may then be applied to the quality score using the frequency band.

Based on the EWMA signal strength and the signal strength velocity, the system 208 may look up their corresponding scores in an exemplary EWMA signal strength/velocity score table 300 illustrated in FIG. 3. Here, the EWMA signal strength and the signal strength velocity are combined into a single score table as illustrated in FIG. 3, because the impact of the signal velocity on connection quality score depends on the EWMA signal strength. For example, for an access point or BSS with a strong signal strength, stability is preferred over change. Therefore, a low velocity should result in a higher connection quality score than a high positive or negative velocity. On the other hand, for an access point or BSS with a weak signal strength, improving signal strength may be preferred over stability. Therefore, a high positive velocity should result in a higher connection quality score than a low velocity. As a result, the EWMA signal strength and the signal strength velocity are combined into a single score table as illustrated in FIG. 3.

Based on the EWMA SNR, the system 214 may look up its corresponding score in an exemplary EWMA SNR score table 400 illustrated in FIG. 4. Based on the frequency band, the system 214 may look up its corresponding score in an exemplary frequency band bonus/penalty table 500 illustrated in FIG. 5. A frequency band of 5 GHz may be generally preferred when there is no particular requirement of 2.4 GHz. 6 GHz may be highly desirable. As such, when the frequency band is 2.4 GHz, a penalty represented by a score of −10 may be assigned. When the frequency band is 6 GHz, an increment boost represented by a score of 5 may be assigned. When the frequency band is 5 GHz, there may be no penalty and no boost, and a score of 0 may be assigned. Values in tables 300, 400 and 500 are example values, presented for illustration purposes only. Values presented in tables 300, 400 and 500 may be subject to change based on further tuning through testing and metrics collection.

The system 214 may compute the quality score by aggregating scores obtained through the tables 300, 400 and 500. In one example, the quality score may be calculated using a simple system of weighting according to the formula below. The equation below is an example equation, presented for illustration purposes only. The equation may be subject to change based on testing and metrics collection. Assuming weights A and B, where A+B=1:

$$\text{Quality Score} = A \cdot \text{EWMA Signal Strength/Velocity Score} + B \cdot \text{EWMA SNR Score} + \text{Frequency Band Bonus/Penalty}$$

To illustrate how the quality score can be computed, in one example, A is 0.7, and B is 0.3. Here, values for A and B are example values, presented for illustration purposes only. These values may be subject to change based on further tuning through testing and metrics collection. OSI layer data 224 for the access point or BSS may include EWMA signal strength at −55 dBm, signal strength velocity at −1.5 dBm/s, SNR at 25 dBm, and frequency band at 2.4 GHz. Based on the EWMA signal strength of −55 dBm and signal strength velocity at −1.5 dBm/s, the corresponding EWMA signal strength/velocity score according to table 300 is 90. Based on the SNR of 25 dBm, the corresponding EWMA SNR score according to table 400 is 85. Based on the frequency band of 2.4 GHz, the corresponding frequency band bonus/penalty according to table 500 is −10. As such, the quality score is computed as follows:

$$\text{Quality score} = 0.7 \cdot \text{EWMA Signal Strength/Velocity Score} + 0.3 \cdot \text{SNR Score} + \text{Frequency Band Bonus/Penalty}$$

$$\text{Quality score} = 0.7 \cdot 90 + 0.3 \cdot 85 - 10$$

$$\text{Quality score} = 78.5$$

In another example, A is 0.6 and B is 0.4. OSI layer data 224 for the access point or BSS may include EWMA signal strength at −67 dBm, signal strength velocity at +5.5 dBm/s, SNR at 20 dBm, and frequency band at 5 GHz. Based on the EWMA signal strength of −67 dBm and signal strength velocity at +5.5 dBm/s, the EWMA signal strength/velocity score according to table 300 is 60. Based on the SNR of 20 dBm, the EWMA SNR score according to table 400 is 50. Based on the frequency band of 5 GHz, the frequency band bonus/penalty score according to table 500 is 0. As such, the quality score is computed as follows:

$$\text{Quality score} = 0.6 \cdot \text{EWMA Signal Strength/Velocity Score} + 0.4 \cdot \text{SNR Score} + \text{Frequency Band Bonus/Penalty}$$

$$\text{Quality score} = 0.6 \cdot 60 + 0.4 \cdot 50 + 0$$

$$\text{Quality score} = 56$$

4.3 Other Factors

Aside from the feedback evaluation and system requirements described in Section 4.1, the quality score described in Section 4.2, the system 214 may determine whether to consider roaming based on other factors such as external reports of connectivity quality. The external reports of connectivity quality may include one or more of the following: current use context and current operating environment of the station 110a. The current use context may refer to the application(s) currently running on the station 110a. The external reports of connectivity quality may be obtained from a general processing architecture or from other modules in the station 110a. In one example, the current use context may indicate that a podcast download or a media streaming is in progress. Alternatively, the current use context may indicate that the station 110a is in a peer-to-peer communication with a collocated station, such as file transfer in progress between the two stations. In the above examples, the system 214 may determine that roaming should not be considered until the work in progress is over.

In another example, in a home that has multiple smart displays and/or smart speakers, the station 110a may be one of the smart displays/speakers. The current use context may suggest that the station 110a is a clock leader among the multiple smart displays and/or speakers. In this case, the system 214 may determine that roaming should not be considered for the station 110a, because if the station 110a is disconnected from other smart displays/speakers, those smart displays/speakers may then need to run an algorithm to determine a new clock leader to make connections with.

In yet another example, if an application or other external system indicates that a user is doing a latency dependent task, such as streaming, the system 214 may determine whether to consider roaming based on the current latency. If the current latency is reported to be poor, then the system 214 may determine that roaming should be considered to find an access point or BSS that provides better latency. If the current latency is reported to be good (e.g., satisfies criteria such as a latency threshold for streaming content), the system 214 may determine that roaming should not be considered as roaming may cause a disruption to the latency dependent task.

4.4 Roam Reasons

Based on the feedback evaluation and system requirements described in Section 4.1, the quality score described in Section 4.2, and other factors described in Section 4.3, the system 214 may determine whether to consider roaming. Once the system 214 determines that roaming should be considered, the system 214 may generate one or more roam reasons, which may be used for candidate access point or candidate BSS selection. Each roam reason may encapsulate why roaming is considered and how important it may be for the station to roam to a different access point or BSS from the current access point or BSS.

Roam reasons may have the following types, including but not limited to, InternetUnreachable, GatewayUnreachable, FailedToAquireAddress, InsufficientRate, BTMDisconnectImminent, InsufficientSignal, DegradingSignal and SubpotimalSignal.

InsufficentSignal, BTMDisconnectImminent, and InsufficientRate may be considered highly important, as they can indicate non-functional WLAN behavior. InternetUnreachable may be considered high important if the device or user requires internet connectivity for their use cases. DegradingSignal and SuboptimalSignal may be considered less important, since they indicate that WLAN is functioning, albeit not optimally.

InternetUnreachable may indicate that Internet is needed, but cannot be reached by using the current access point or current BSS. GatewayUnreachable may indicate that there is no route to a gateway. FailedToAquireAddress may indicate a failure to receive an address (DHCP or static). InsufficientRate may indicate that the current access point or current BSS cannot achieve the rate required by the system needs. BTMDisconnectImminent may indicate that the access point has suggested a roam, and disconnect may be imminent. InsufficientSignal may indicate very poor connection strength according to OSI layer 1 data 224 measurements. DegradingSignal may indicate an insufficient signal or that disconnect might be approaching based on degrading OSI layer 1 data 224 measurements. SubpotimalSignal may indicate functional, but suboptimal connection based on OSI layer 1 data 224 measurements, and a need to seek a better access point or BSS.

5. Evaluate Candidate Connections

Once the system 214 determines that the roaming should be considered, the system 214 may then determine which candidate access point or candidate BSS should be connected to. If the system 214 identifies a better access point or BSS than the current access point or BSS, then the system 214 may proceed with roaming. On the other hand, if no access point or BSS is better than the current access point or BSS, the system 214 may decide not to roam. The system 214 may compute a quality score for each candidate access point or candidate BSS using the scoring process described in Section 4.2. The quality score for each candidate access point or BSS may be calculated based on its respective physical qualities of the connection, such as EWMA signal strength, signal strength velocity, and EWMA SNR, frequency band, among others. The score for each candidate access point or BSS may represent the physical layer connection quality of the candidate access point or BSS. The system 214 may compare all candidate access points or candidate BSSs to determine the "best" access point or BSS for the current situation, by taking into account their quality scores, any roam reason, historical data of each access point or BSS, and BTM indications. The historical data of each access point or BSS may include for example Internet reachability and disconnect reasons.

5.1 Adjust Scores

The system 214 may adjust the quality scores based on potential disadvantages (e.g., risks), possible resource impact (e.g., costs) and/or potential benefits (e.g., rewards) involved with roaming. The adjustments, if any, may help account for the necessity and risk of roaming by decreasing the quality score of the current access point or BSS when it has proven inadequate, increasing the quality scores of candidate access points or candidate BSSs that accomplish the goal of roaming, and biasing toward stability when the reason for roaming is non-critical. In particular, the system 214 may adjust the quality score for each access point or BSS based on the roam reason, historical data, and BTM indication. FIG. 6 illustrates a score adjustment table 600 suggesting adjustments based on these attributes. First, the system 214 may adjust the quality score based on the roam reason. The roam reason determined in Section 4.4 may provide a goal that the system 214 would like to achieve via roaming, and may help to determine how much risk to accept when choosing to roam. For example, the more inadequate the current access point or current BSS, the more urgent a roam is, so the more risk is acceptable. Also, the worse the existing connection, the less to lose in terms of roaming, so a more aggressive roam decision may be made.

The system 214 may factor the roam reason determined in Section 4.4 into the quality score to ensure candidate access points or candidate BSSs that accomplish the goal of roaming and address any shortcomings of the current connection are more likely to be chosen, and to weigh in how crucial roaming is. The system 214 may degrade the quality score of the current access point or current BSS when the roam reason indicates there is not much performance to lose. By way of example, as shown in FIG. 6, when roaming is critical, the system 214 may decrease the quality score of the current access point or current BSS by 50. When roaming is important, the system 214 may decrease the quality score of the current access point or current BSS by 15. In the case of risk-averse roaming, the system 214 may increase the quality score of the current access point or current BSS by 15. For any access point or BSS that is suggested by BTM indication, the system 214 may increase its quality score by 25. When the roam reason type is DegradingSignal, the system 214 may not make any adjustment, but may consider roaming worthwhile.

In addition, the system 214 may adjust the quality score for each candidate access point or BSS based on historical data of the candidate access point or BSS. The historical data may include historical performance, indicating how well the candidate access point or BSS has performed in the past (e.g., within the past 30 minutes, past 12 hours, past 7 days, or other timeframe). Roaming to a connection that has performed well in the past may carry less risk. The system 214 may increase the quality score for a candidate access point or BSS if its past performance is great, as roaming to that candidate access point or BSS may carry less risk. On the other hand, the system 214 may decrease the quality score for a candidate access point or BSS if its past performance is poor, as the poor past performance may suggest unstable future performance. Historical data may include, but not limited to, Internet reachability, disconnect reason code, and connection duration. With reference to FIG. 6, for any access point or BSS that shows historical Internet reachability, the system 214 may increase its quality score by 10. For any access point or BSS with historical FailedToConnect reason code, the system 214 may decrease its quality score 5. For any access point or BSS with historical connection duration of less than 1 minute, the system 214 may decrease its quality score by 15, as there is a reason to believe that that connection may be unstable in the future. If the historical connection duration is less than 5 minutes, but not less than 1 minute, the system 214 may decrease the quality score by 5. If the historical connection duration is greater than 60 minutes, the system 214 may increase the quality score by 10. For any access point or BSS that shows historical Internet reachability, the system 214 may increase its BSS score by 10. Further, the system 214 may adjust the quality score based on the BTM indication. For any access point or BSS suggested by the current access point, the system 214 may increase its quality score by 15.

Adjustment types and magnitudes presented in FIG. 6 are for illustration purposes only. Adjustment types may not be limited to roam reason, historical data, and BTM indication. The adjustment types and magnitudes as presented in FIG. 6 may be subject to change based on further tuning through testing and metrics collection. Aside from roam reason, historical data and BTM indication, the quality score may be adjusted based on other factors, such as one or more of the following: expense of changing a network or subnet, and power consumption for changing the network or subnet. Roaming to one connection may interrupt connectivity to the user, making it more costly than one that can occur seamlessly. For example, the station 110a may maintain an IP address that other devices or stations may actively communicate with. Roaming to a candidate access point or BSS may incur potential costs and risks. For example, roaming to the candidate access point or BSS may cause a change in the IP address of the station, which in turn may cause higher level connections to be torn down and recreated, and may potentially cause an interruption to the user. In view of these potential costs and risks, the system 214 may decide that roaming to that candidate access point or BSS is not worthwhile. To mitigate the above costs and risks, the system 214 may reduce the quality score of that candidate access point or BSS.

In yet another example, the current access point or BSS that the station 110a is connected to may not provide a sufficient rate. A candidate access point or BSS may provide a better rate than the current access point or BSS. The system 214 may in turn increment the quality score of the candidate access point or BSS. The increase in the score may be regarded as an anticipated reward.

5.2 Selecting the "Best" Access Point or BSS

Once the system 214 finishes adjusting the quality scores, the system 214 may compare all access points or BSSs including the current access point or BSS and all candidate access point or BSSs, and select the access point or BSS with the highest score as the "best" access point or BSS. If the selected access point or BSS is the current access point or BSS, or if the current access point or BSS has the highest score, the system 214 may not initiate roaming. If the selected access point or BSS is not the current access point or BSS, and the anticipated improvement warrants the risk of roaming, the system 214 may initiate a roam to the selected access point or BSS.

6. Other Considerations

The system 214 may include additional implementations to take into account some other considerations detailed below.

6.1 Prevent Thrashing

Thrashing may occur when the system 214 is tuned to roam too easily or when all candidate access points or BSSs show poor performance. For example, when the current connection is functional but a better connection might be possible, roaming may not be necessary. To prevent thrashing, the system 214 may perform an evaluation of roams, such as determining how successful a roam is. Such evaluation may be valuable for preventing thrashing and informing future roam decisions. The system 214 may record recent roam reasons for each access point or BSS. The system 214 may use the recent roam reason for roaming to a specific access point or BSS to determine if that access point or BSS accomplishes the goal identified in the roam reason. The system 214 may consider the evaluation result, recent roam reasons for any access point or BSS, and/or any other historical metrics, when deciding whether to roam to that access point or BSS. Assessing the evaluation result, recent reasons and/or any other historical metrics may help prevent jumping between suboptimal access points or BSSs or constantly seeking better performance, and ensure poor roam decisions are not repeated. In another example, the system 214 may implement a timer to perform adjustments on the quality scores, so as to avoid adjusting the quality scores too frequently, thus reducing roaming frequency.

6.2 Consider Roaming Periodically

It may sometimes be beneficial to consider roaming and evaluate candidate access points or BSSs even when the current connection is adequate. For example, the station may be connected on a 2.4 GHz access point or BSS which is adequate for the station, but a 5 GHz access point or BSS may provide a better performance. To address this, the system 214 may consider roaming periodically, even when there is not a critical roam reason. Roaming when the current connection is adequate may be inherently risky. To mitigate such risks, the system 214 may consider roaming when stability is not crucial and power is not in short supply. The system 214 may also ensure that any selected access point or BSS is extremely risk-averse. When deciding roaming, the system 214 may bias heavily toward the stable current connection, and only perform roaming if the selected candidate access point or BSS provides a significant anticipated advantage.

6.3 Roaming Profiles

The system 214 may use a profile for each station, where each profile may store value parameters for determining and/or evaluating roaming. These value parameters may be subject to tuning to improve performance of each station. These value parameters may vary by the station, depending on its hardware, power usage and features. For example, a laptop may have a different set of considerations than a stationary device, so it would have a different profile. Profiles may enable engineers to change these value parameters for different stations without changing the underlying code. Each profile may have an identifier which may be logged to help engineers debug issues.

7. Use Case Scenarios

In a first example, the current connection may be stable and performant. For instance, the current access point or BSS may have a strong EWMA signal strength and a stable EWMA SNR. The signal strength velocity of the current access point or BSS may be close to 0. As a result, the current access point or BSS may have a high quality score. Based on the high quality score of the current access point or BSS, the system 214 may decide that the current access point or BSS is adequate, and roaming should not be considered, thus obviating any need to evaluate any candidate access points or BSSs.

In a second example, the current connection may be stable and good, and a candidate access point or BSS with a better performance may come online. Similar to the first example, the current access point or BSS may have a strong EWMA signal strength and a stable EWMA SNR. The signal strength velocity of the current access point or BSS may be close to 0. The system 214 may calculate a high quality score for the current access point or BSS. Based on the high quality score of the current access point or BSS, the system 214 may decide that the current access point or BSS is adequate, and roaming should not be considered, thus obviating any need to evaluate the candidate access point or BSS despite its high performance.

In a third example, the current access point or BSS coverage may overlap with a candidate access point or BSS coverage. As the station 110*a* moves from the coverage area of the current access point or BSS to the coverage area of the candidate access point or BSS, the EWMA signal strength and EWMA SNR of the current access point or BSS may decrease, and the signal strength velocity of the current access point or BSS may become slightly negative. The system 214 may determine that roaming should be considered, and identify SuboptimalSignal as the roam reason. The candidate access point or BSS may show better velocity and signal, resulting in a higher quality score than the current access point or BSS. As a result, the system 214 may decide to roam to the candidate access point or BSS.

In a fourth example, the current connection may be static but weak, and a better candidate access point or BSS may come online. For the current access point or BSS, its EWMA signal strength and EWMA SNR may be low, and its signal strength velocity may be close to 0. The system 214 may determine that roaming should be considered, and identify InsufficientSignal as the roam reason. The candidate access point or BSS may show better signal strength and SNR. The velocity of the candidate access point or BSS may be close to 0. The candidate access point or BSS may have a higher quality score than the current access point or BSS. As a result, the system 214 may decide to roam to the candidate access point or BSS.

In a fifth example, the current connection may be static, although usable, but weak. The candidate access point or BSS may be equally weak. For the current access point or BSS, the signal strength and SNR may be low, and its velocity may be close to 0. The system 214 may determine that roaming should be considered, and identify InsufficientSignal as the roam reason. The system 214 may determine that the current access point or BSS has the highest quality score, or that the current access point or BSS has the same score as the candidate access point or BSS. As a result, the system 214 may decide not to initiate roam.

In a sixth example, a station may transition from a coverage area of the current access point or BSS to a coverage area of a candidate access point or BSS, where the two coverage areas may barely overlap with each other. For the current access point or BSS, during this transition process, its signal strength and SNR may decrease, and its velocity may approach negative. Access point or BSS selection may be performed twice. By way of example, as the connection to the current access point or BSS degrades, the system 214 may determine that roaming should be considered, and identify SuboptimalSignal as the roam reason. However, the candidate access point or BSS may not be visible or may not show enough anticipated performance to be better than the current access point or BSS. In this situation, since neither the current access point or BSS nor the candidate access point or BSS is ideal, the station would continuously stay on the current access point or BSS because at least the current access point or BSS is functional. Then, as the connection to the current access point or BSS degrades even further, the system 214 may determine that roaming should be considered, and identify InsufficientSignal as the roam reason. The current access point or BSS may be now barely functional or not functional, whereas the candidate access point or BSS may be more in range and potentially offering better performance, resulting in a higher quality score than that of the current access point or BSS. As a result, the system 214 may decide to roam to the candidate access point or BSS.

In a seventh example, a station may transition rapidly out of a coverage area of the current access point or BSS. For the current access point or BSS, the signal strength and SNR may degrade. The current access point or BSS may have a high negative velocity. The system 214 may decide that roaming should be considered, and identify DegradingSignal as the roam reason.

In an eighth example, the current access point or BSS may provide suboptimal connection to a station. The station may quickly pass through a coverage average of a better candidate access point or BSS. For the current access point or BSS, its signal strength and SNR scores may be low, and its velocity may be near 0. The system 214 may decide that roaming should be considered, and identify SuboptimalSignal as the roam reason. The candidate access point or BSS may have a high signal strength and a stable SNR, but its velocity may be high. As a result, the quality score for the candidate access point or BSS may be less than that of the current access point or BSS. The system 214 may thus determine that the current access point or BSS has the highest score, and decide not to initiate roam.

In a ninth example, a station may move through offices, while one or more applications running on the station are relying on an active Internet service. Maintaining good connection strength is thus important. To ensure smooth roaming, the system 214 may identify SuboptimalSignal as the roam reason, and avoid any roaming that may result in poor connection strength.

In a tenth example, the current access point or BSS may show a strong signal, but no Internet reachability. A candidate access point or BSS may show a similar signal. The system 214 may decide that roaming should be considered, and identify InternetUnreachable as the roam reason. The quality score for the current access point or BSS may be similar to that of the candidate access point or BSS based on their similar signal strengths. Since the current access point or BSS has no Internet reachability, the system 214 may degrade the quality score of the current access point or BSS. As a result, the quality score of the current quality score may be lower than that of the candidate access point or BSS. The system 214 may thus decide to roam to the candidate access point or BSS.

In an eleventh example, the current access point or BSS may show missing reachability, such as no Internet and/or gateway reachability. A candidate access point or BSS may show a relatively weaker signal than the current access point or BSS or other access points or BSSs, but historical reachability. The system 214 may decide that roaming should be considered, and identify InternetUnreachable and/or GatewayUnreachable as the roam reason(s). The quality score for the current access point or BSS may be higher than that of the candidate access point or BSS based on signal strength. Since the current access point or BSS lacks reachability, the system 214 may degrade the quality score of the current access point or BSS. Since the candidate access point or BSS has historical reachability, the system 214 may increment the quality score of the candidate access point or BSS. As a result, the quality score of the candidate access point or BSS may exceed that of the current access point or BSS. The system 214 may thus decide to roam to the candidate access point or BSS.

In a twelfth example, a station may be connected with the current access point or BSS. Two candidate access points or BSSs may be present, including a first candidate access point or BSS and a second candidate access point or BSS. The station may receive a BTM indication from the current access point associated with the current access point or BSS, suggesting one of two alternate candidate access points or BSSs, for example, suggesting the first candidate access point or BSS. The system 214 may decide that roaming should be considered, and identify BTMDisconnectImminent as the roam reason. The quality scores of the two candidates may be similar due to their similar signal strength. The system 214 may increment the score of the first candidate access point or BSS, as the first candidate access point or BSS is suggested according to the BTM indication. As a result, the first candidate access point or BSS may have the highest score. The system 214 may thus decide to roam to the first candidate access point or BSS.

8. Access Point or BSS Evaluation Considerations

Access point or BSS evaluation disclosed herein essentially analyzes environments of client devices (stations) and those devices interactions with that environment. Data for each access point or BSS may be stored on the station, in addition to data about device usage and predicted user intent. SSID and BSSID scrubbing may be employed, in which data for each access point or BSS including signal strength, changes in signal strength, noise, rates, and/or connectivity status, among others, do not include information that can be associated with a user of the client device(s).

9. Access Point or BSS Evaluation Process

Figure 7:
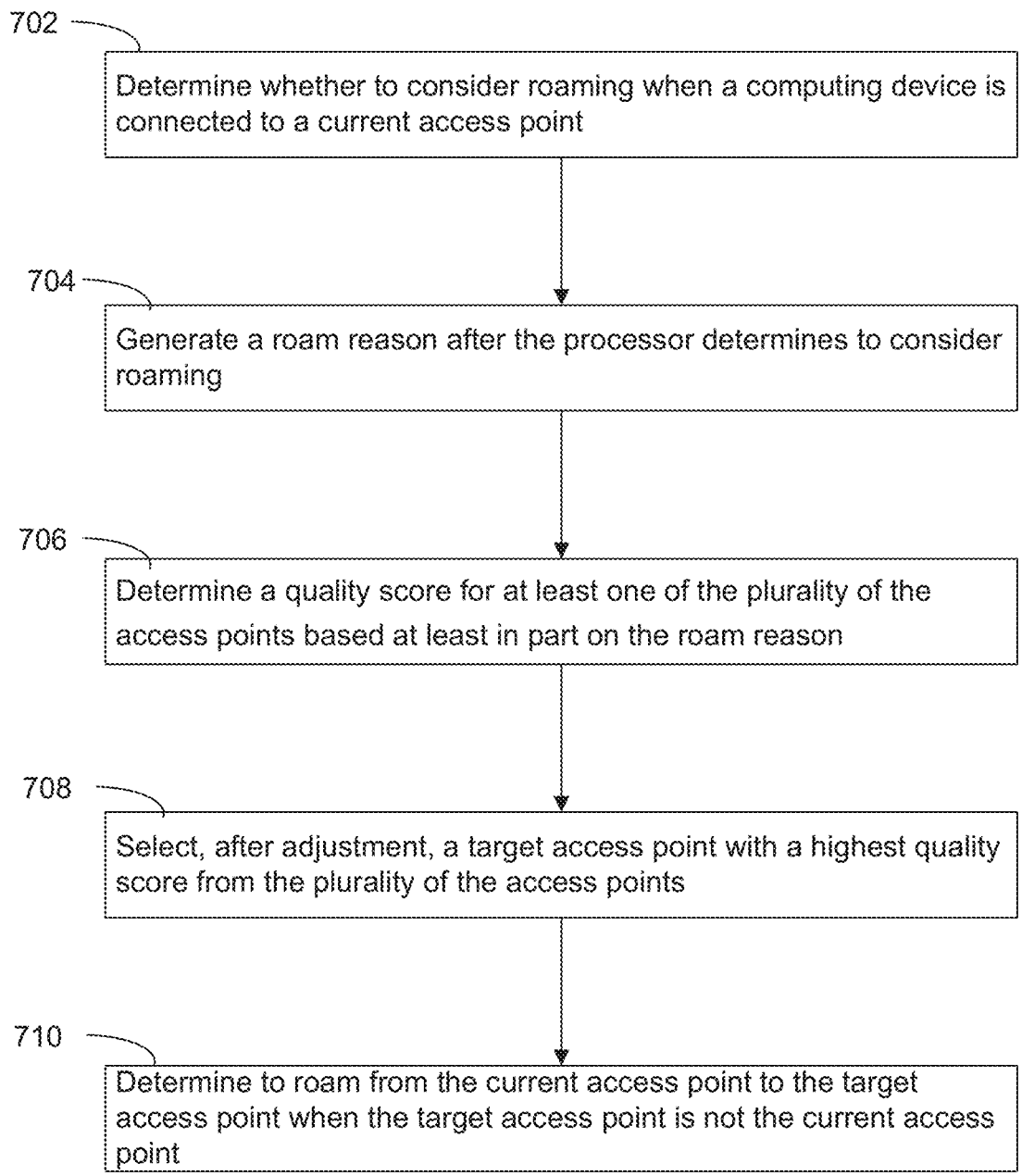
FIG. 7 illustrates a flow diagram showing an exemplary method for deciding roaming in accordance with aspects of the disclosure.

FIG. 7 illustrates a flow chart illustrating a process for evaluating access points to determine roaming. At 702, the processor(s) 202 may determine whether to consider roaming when a computing device such as a station is connected to a current access point. The computing device may be within a coverage range of each of a plurality of access points. The plurality of access points may include the current access point and at least one candidate access point different from the current access point. At 704, the processor 202 may generate a roam reason after the processor 202 determines to consider roaming. At 706, the processor 202 may determine a quality score for at least one of the plurality of the access points based at least in part on the roam reason. At 708, the processor 202 may select a target access point with a highest quality score from the plurality of the access points. At 710, the processor 202 may determine to roam from the current access point to the target access point when the target access point is not the current access point.

In one example, the processor 202 may instruct the transceiver 204 to roam from the current access point to the target access point when the target access point is not the current access point. The quality score may indicate physical layer connection quality of its corresponding access point. The processor 202 may determine the quality score by calculating the quality score for each of the plurality of the access points, and adjusting the quality score for at least one of the plurality of the access points based at least in part on the roam reason. The processor 202 may calculate the quality score for each of the plurality of the access points based on at least one physical attribute of its corresponding access point. The at least one physical attribute may include signal strength, signal strength velocity, signal-to-noise ratio (SNR), and frequency band. The processor 202 may adjust the quality score for at least one of the plurality of the access points based at least in part on one or more of the following: historical performance of its corresponding access point, a roam suggestion or disconnect indication provided by the current access point, or power consumption for changing the network or subnet.

The processor 202 may determine whether to consider roaming by evaluating one or more of the following: connection quality of the current access point reported by a network protocol stack or a network policy module of the computing device, a system requirement of the computing device, an external report of connectivity quality including one or more of a current use context of the computing device and a current operating environment, and the quality score of the current access point. The processor 202 may record into the memory 206 data associated with each access point for approximating connection quality of the access point. The processor 202 may monitor and update the data. The data may be stored in the memory 206. The data associated with each access point may relate to one or more of the following: OSI layers 1, 2, 3 or a WLAN management module. The data related to the OSI layer 1 may include one or more of the following: EWMA signal strength, signal strength velocity, EWMA SNR, channel and channel bandwidth. The data related to the OSI layer 2 may include one or more of the following: EWMA PHY rate, RRM report, and BTM indication. The data related to the OSI layer 3 may include one or more of the following: current Internet reachability, historical Internet reachability, and gateway reachability. The data related to the WLAN management module may include historical data indicating one or more of the following: time-to-connect, connection duration, disconnect reason, disconnect signal strength, and average TX PHY rate.

The one or more processors 202 may initiate a roam scan to acquire data associated with the at least one candidate BSS. In one example, the roam reason may include one or more of the following: Internet unreachable, no route to a gateway, failure to receive an address, failure to meet rate requirement, imminent disconnection, poor connection strength, signal insufficiency and suboptimal connection.

Figure 8:
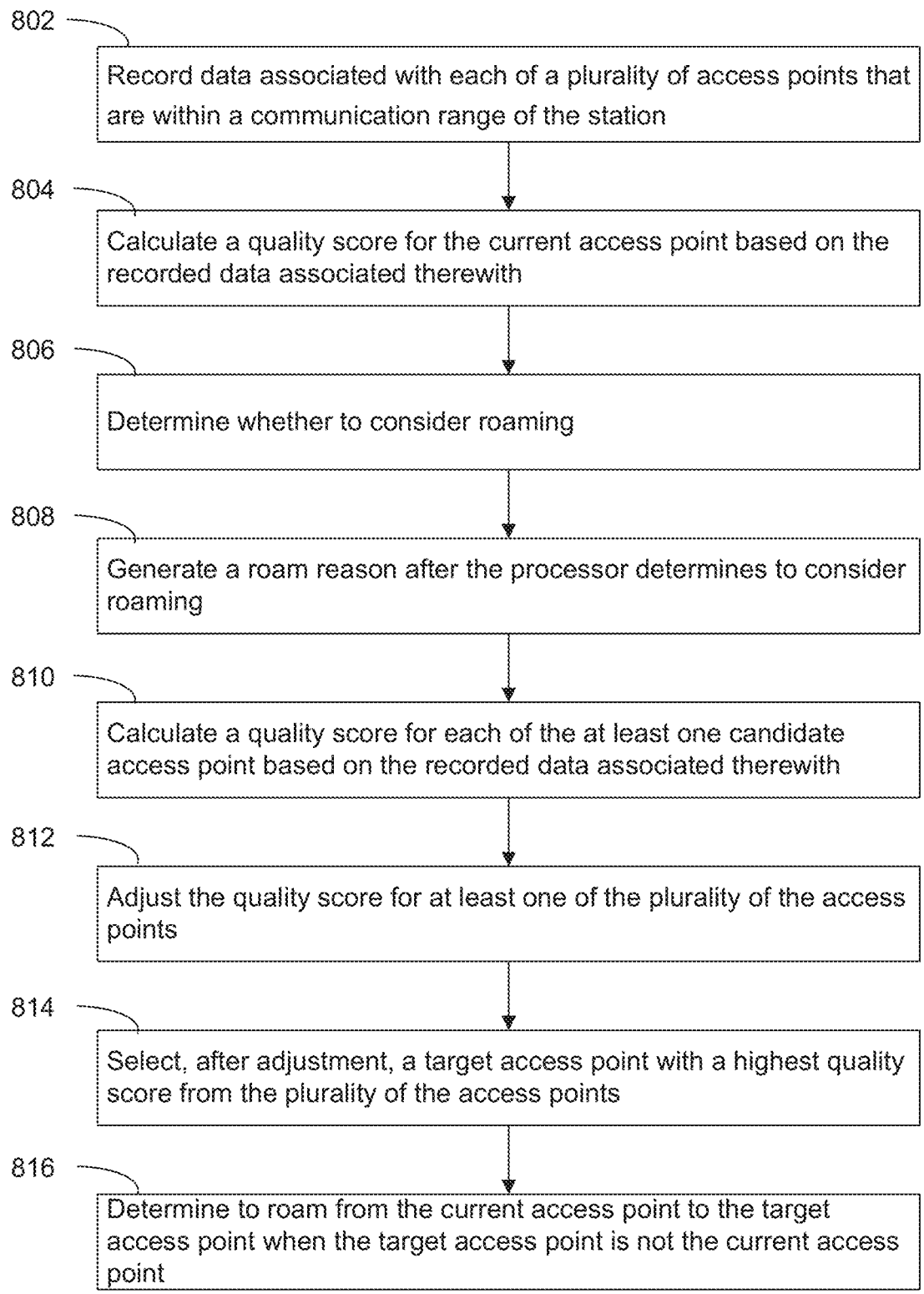
FIG. 8 illustrates a flow diagram showing another exemplary method for deciding roaming in accordance with aspects of the disclosure.

FIG. 8 illustrates a flow chart illustrating another process for evaluating access points or BSSs to determine roaming. At 802, the memory 206 may record data associated with each of a plurality of access points or BSSs that are within a communication range of the station 110a. The plurality of access points or BSSs may include the current access point or BSS that the station 110a is connected to and at least one candidate access point or BSS. At 804, one or more processors 202 may calculate a quality score for the current access point or BSS based on the recorded data associated therewith. The quality score for the current access point or BSS may indicate physical layer connection quality of the current access point or BSS. At 806, the processor 202 may determine whether to consider roaming by evaluating at least one of the following: feedback about the current access point or BSS, a system requirement of the station, a current use context of the station, and the score for the current access point or BSS. At 808, the processor 202 may generate a roam reason after the processor 202 decides to consider roaming. At 810, the processor 202 may calculate a quality score for each of the at least one candidate access point or BSS based on the recorded data associated therewith. The score for each of the at least one candidate access point or BSS may indicate physical layer connection quality thereof. At 812, the processor 202 may adjust the quality score for at least one of the plurality of the access points or BSSs based on one or more of the following: the roam reason, historical data of its corresponding access point or BSS and a BTM indication of the current access point or BSS. After adjustment, at 814, the processor 202 may select a target access point or BSS with a highest score from the plurality of the access points or BSSs. At 816, the processor 202 may determine to roam from the current access point or BSS to the target access point or BSS when the target access point or BSS is not the current access point or BSS.

10. Example State-based Roaming Approach

Figure 9:
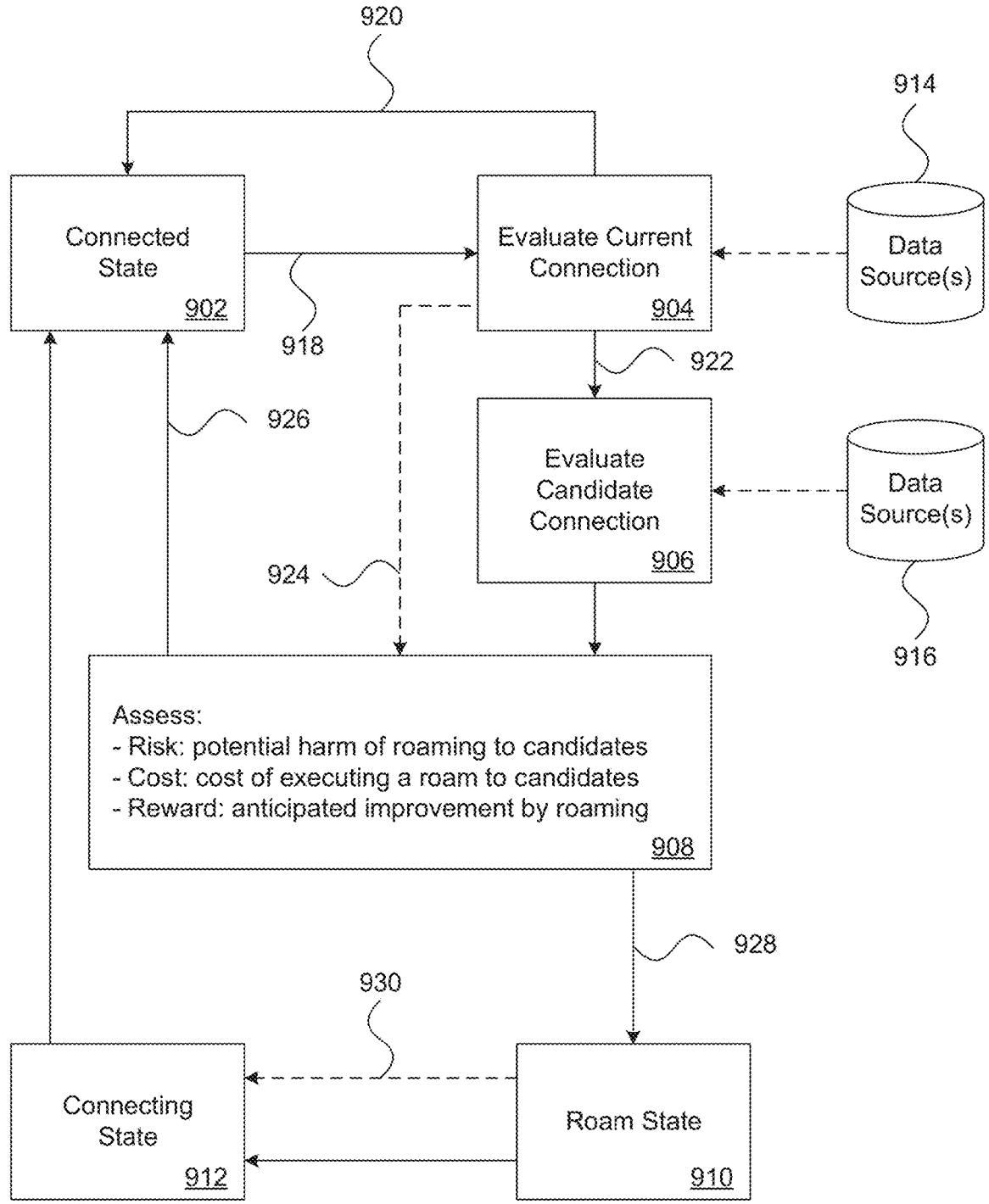
FIG. 9 illustrates a state-based roaming approach in accordance with aspects of the disclosure.

FIG. 9 illustrates an example 900 of a state-based roaming approach that can be employed by state machine 224 executed by the processor(s) 202. Here, the solid boxes indicate different states, the containers indicate data sources, the solid arrows indicate state transitions, and the dashed arrows indicate data flow. The states include connected state 902, evaluate current connection state 904, evaluate candidate connections state 906, assess state 908, roam state 910 and connecting state 912. Data source 914 provides data to evaluate current connection state 904, and data source 916 provides data to evaluate current connection state 906.

While in the connected state 902, the station (client device) is wireless connected to a serving access point or BSS (e.g., BSS 104a of FIG. 1) via access point 102a. One or more other access points or BSSs (e.g., BSSs 104b and 104c of FIG. 1) may be suitable roaming candidates. As shown by arrow 918, periodically such as every N seconds or upon a particular conditional event (e.g., a signal), the state may transition to evaluate current connection state 904. Here, data from data source 914 is evaluated. This data may include one or more of signal data, data rates, reachability information, a system requirement(s), etc. Upon determination that the current connection is adequate, the state returns to the connected state 902 as shown by arrow 920.

Upon determination that the current connection is inadequate, as shown by arrow 922 the state transitions to evaluate connected connections state 906. Here, data from data source 916 is evaluated. This data may include one or more of scan signal data, historical data, BTM indications, etc. Upon evaluation, the state machine proceeds to the assess state 908, with the data flow including the current connection evaluation and roam reasons, if applicable, as shown by dashed arrow 924. At block 908, the assessment includes a risk/cost/reward evaluation, such as described in the various scenarios and examples above. Thus, rather than just choosing the access point or BSS with the best score (proxy for connection quality), the system is able to evaluate the risk (e.g., via current connection quality), anticipated reward (e.g., based on candidate connection quality and user/system needs) and cost (e.g., the expense of changing networks, subnets and/or power consumption), and determine if roaming is the best decision at this point in time. Here, if the system (e.g., BSS evaluation system 214) determines that roaming is not currently the best option, then the state returns to the connected state 902 as shown by arrow 926.

However, when it is determined that roaming is currently the best option, then the state transitions to roam state 910 as shown by arrow 928. Once roaming is complete, the state transitions to the connecting state 912, which includes selected roaming candidate data as shown by dashed arrow 930. From here, using the roaming candidate data, the state will enter the connection state 902.

11. Alternative Roaming Factors

There may be other factors that can be used alternatively or in addition to the above when analyzing whether to roam. This can include employing predictive data rates to make network and/or access point selections by a wireless computing device. As discussed in detail in application Ser. No. 17/830,559, entitled "Predictive Data Rates for Wireless Roaming and Selection," this may include modeling various firmware and hardware combinations that evaluate various characteristics and performance of communication links. The result is a reliable approach for selecting the network and/or access point, thereby providing a performant wireless experience to the user.

By way of example, a prediction system can be configured to predict the data rate of an access point or BSS prior to forming a network connection between the wireless device and the access point of the BSS. The predicted data rate may closely approximate the data rate that the firmware running on the wireless device would select upon forming the connection with the BSS. In this scenario, the prediction system may predict the data rate for a BSS or access point based on data associated with that BSS or access point, including one or more of the following: signal strength, signal strength velocity, signal-to-noise ratio (SNR), frequency band, 802.11 mode, and historical data based on one or more prior connections, among other possibilities.

The prediction system may implement one or more machine learning models to perform data rate prediction. According to one aspect, the model(s) may be a multivariate non-linear regression model(s). The machine learning model(s) may employ, by way of example, a Transformer-type architecture, a convolutional neural network (CNN), recurrent neural network (RNN), long short-term memory (LS™) network or combination thereof. Other machine learning architectures may be used, so long as they support multivariate non-linear regression. The machine learning model may be trained with pre-processed information, including, for example, testing data and production data.

Thus, when evaluating potential issues (e.g., risks and costs) and benefits (e.g., rewards), the system may alternatively or additionally utilize predictive data rates before making a decision to roam.

12. Example System Components

The memory 206 may be databases that store information accessible by the processor(s) 202, including, but not limited to: instructions and data (e.g., the BSS evaluation system 214) that may be executed or otherwise used by the processor(s). The memory may be of any type capable of storing information accessible by the processor(s), including a computing device-readable medium. The memory may be a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processor(s) 202 may be any conventional processors, such as commercially available GPUs, CPUs, TPUs, etc. Alternatively, each processor may be a dedicated device such as an ASIC or other hardware-based processor. Although FIGS. 2A-B functionally illustrate the processors, memory as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system. Accordingly, references to a processor or computing device will be understood to include references to a collection of processors or computing devices or memories that may or may not operate in parallel. The processor(s) 202 may access the memory 206 via one or more networks.

Each of the stations 110a-g may include a computing system and/or a desktop computer. Each station 110a-g may include one or more components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users. Example stations include, but not limited to, a mobile phone, a laptop, a smart home device such as a smart display or a speaker, among other possibilities.

Each BSS 104a-c may support a network. The network may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for determining roaming, comprising:
   determining, by one or more processors of a computing device, whether to consider roaming when the computing device is wirelessly connected to a current access point, the computing device being within a wireless coverage range of a plurality of access points, the plurality of access points including the current access point and at least one candidate access point different from the current access point;
   generating, by the one or more processors, a roam reason after the one or more processors determine to consider roaming;
   determining, by the one or more processors, a quality score for at least one of the plurality of the access points based at least in part on the roam reason;
   selecting, by the one or more processors after the determining, a target access point with a highest quality score from the plurality of the access points; and
   determining, by the one or more processors, to roam from the current access point to the target access point when the target access point is not the current access point.

2. The method of claim 1, further comprising:
   roaming, by a transceiver of the computing device, from the current access point to the target access point when the target access point is not the current access point.

3. The method of claim 1, wherein the quality score for each corresponding access point indicates a physical layer connection quality for the corresponding access point.

4. The method of claim 1, wherein determining the quality score includes:
   calculating the quality score for each of the plurality of the access points; and
   adjusting the quality score for at least one of the plurality of the access points based at least in part on the roam reason.

5. The method of claim 4, wherein:
   calculating the quality score is based on at least one physical attribute of a corresponding one of the plurality of access points; and
   the at least one physical attribute includes one or more of signal strength, signal strength velocity, signal-to-noise ratio, or a frequency band.

6. The method of claim 4, wherein adjusting the quality score for at least one of the plurality of the access points is based at least in part on one or more of:
   historical performance of a corresponding one of the plurality of access points based on one or more prior connections within a selected timeframe;
   a roam suggestion or disconnect indication provided by the current access point; or
   power consumption for changing a network or subnet.

7. The method of claim 1, wherein determining whether to consider roaming includes evaluating one or more of:
   connection quality of the current access point reported by a network protocol stack or a network policy module of the computing device;
   a system requirement of the computing device;
   an application currently running on the computing device;
   a current operating environment of the computing device; or
   the quality score of the current access point.

8. The method of claim 1, further comprising recording, monitoring and updating data associated with each access point for approximating connection quality of the access point.

9. The method of claim 8, wherein the data associated with each access point relate to one or more of: Open Systems Interconnect (OSI) layer 1, OSI layer 2, OSI layer 3, or a wireless local area network (WLAN) management module.

10. The method of claim 9, wherein the data related to the OSI layer 1 include one or more of: exponentially weighted moving average signal strength, signal strength velocity, exponentially weighted moving average signal-to-noise ratio, channel or channel bandwidth.

11. The method of claim 9, wherein the data related to the OSI layer 2 includes one or more of: exponentially weighted moving average physical layer rate, radio resource management report, or a transition management indication.

12. The method of claim 9, wherein the data related to the OSI layer 3 includes one or more of: current Internet reachability, historical Internet reachability, or gateway reachability.

13. The method of claim 9, wherein the data related to the WLAN management module includes historical data indicating one or more of: time-to-connect, connection duration, disconnect reason, disconnect signal strength, or average transmit physical layer rate.

14. The method of claim 1, wherein the roam reason includes one or more of:
a) Internet unreachable;
b) no route to a gateway;
c) failure to receive an address;
d) failure to meet a rate requirement;
e) imminent disconnection;
f) connection signal strength below a threshold;
g) signal insufficiency; or
h) suboptimal connection not satisfying one or more criteria.

15. A system comprising:
a transceiver configured to establish a wireless connection with a first access point of a plurality of access points, the transceiver being within a wireless coverage range of each of the plurality of access points; and
one or more processors operatively coupled to the transceiver, the one or more processors being configured to:
determine whether to consider roaming;
generate a roam reason after determining to consider roaming;
determine a quality score for at least one of the plurality of the access points based at least in part on the roam reason;
select, after the determination, a target access point with a highest quality score from the plurality of the access points; and
determine to roam from the first access point to the target access point when the target access point is not the first access point.

16. The system of claim 15, wherein the one or more processors are further configured to instruct the transceiver to roam from the first access point to the target access point when the target access point is not the first access point.

17. The system of claim 15, wherein the one or more processors is configured to determine the quality score by:
calculation of the quality score for each of the plurality of the access points; and
adjustment of the quality score for at least one of the plurality of the access points based at least in part on the roam reason.

18. The system of claim 17, wherein the one or more processors are configured to calculate the quality score for each of the plurality of the access points based on at least one physical attribute of its corresponding access point, the at least one physical attribute including one or more of signal strength, signal strength velocity, signal-to-noise ratio, or a frequency band.

19. The system of claim 17, wherein the one or more processors are configured to adjust the quality score for at least one of the plurality of the access points based at least in part on one or more of the following:
historical performance of a corresponding one of the plurality of access points based on one or more prior connections within a selected timeframe;
a roam suggestion or disconnect indication provided by the first access point; or
power consumption for changing a network or subnet.

20. The system of claim 15, wherein the one or more processors are configured to determine whether to consider roaming by evaluating one or more of:
connection quality of the first access point reported by a network protocol stack or a network policy module of the system;
a system requirement of the system;
an application currently running on the system;
a current operating environment of the system; or
the quality score of the first access point.

21. A non-transitory computer-readable medium comprising computer-readable instructions that when executed by a processor, cause the processor to:
determine whether to consider roaming when a computing device is wirelessly connected to a current access point, the computing device being within a wireless coverage range of a plurality of access points, the plurality of access points including the current access point and at least one candidate access point different from the current access point;
generate a roam reason after the processor determines to consider roaming;
determine a quality score for at least one of the plurality of the access points based at least in part on the roam reason;
select a target access point with a highest quality score from the plurality of the access points; and
determine to roam from the current access point to the target access point when the target access point is not the current access point.

* * * * *